(12) United States Patent
Gitt (10) Patent No.: US 8,051,732 B2
(45) Date of Patent: Nov. 8, 2011

(54) DUAL CLUTCH GROUP TRANSMISSION SHIFTTABLE UNDER LOAD

(75) Inventor: Carsten Gitt, Stuttgart (DE)

(73) Assignee: Daimler AG, Stuttgart (DE)

( * ) Notice: Subject to any disclaimer, the term of this patent is extended or adjusted under 35 U.S.C. 154(b) by 815 days.

(21) Appl. No.: 12/075,789

(22) Filed: Mar. 13, 2008

(65) Prior Publication Data

US 2008/0245167 A1   Oct. 9, 2008

Related U.S. Application Data

(63) Continuation-in-part of application No. PCT/EP2006/008434, filed on Aug. 29, 2006.

(30) Foreign Application Priority Data

Sep. 15, 2005 (DE) .......................... 10 2005 044 068

(51) Int. Cl.
*F16H 3/08* (2006.01)
(52) U.S. Cl. .......................................... 74/331; 74/330
(58) Field of Classification Search .................... 74/330, 74/331
See application file for complete search history.

(56) References Cited

U.S. PATENT DOCUMENTS

| 3,362,245 | A * | 1/1968 | Welch, Jr. et al. | 74/359 |
| 6,460,425 | B1 | 10/2002 | Bowen | |
| 7,231,843 | B2 * | 6/2007 | Gumpoltsberger et al. | 74/329 |
| 7,377,191 | B2 * | 5/2008 | Gitt | 74/330 |
| 7,437,964 | B2 * | 10/2008 | Gitt | 74/330 |
| 7,462,121 | B2 * | 12/2008 | Janson et al. | 475/5 |
| 7,469,609 | B2 * | 12/2008 | Baldwin | 74/330 |
| 2007/0113696 | A1 * | 5/2007 | Haka et al. | 74/340 |

FOREIGN PATENT DOCUMENTS

| DE | 35 46 454 C2 | 2/1987 |
| DE | 43 30170 C2 | 3/1995 |
| DE | 101 02 028 A1 | 8/2001 |
| DE | 100 37 398 A1 | 2/2002 |
| DE | 103 38 355 A1 | 3/2003 |
| GB | 2 103 317 A | 2/1983 |
| WO | WO 00/39484 | 7/2000 |
| WO | WO 2004/048755 | 10/2004 |
| WO | WO 2004/113686 | 12/2004 |
| WO | WO 2005021999 A1 * | 3/2005 |

* cited by examiner

*Primary Examiner* — Tisha Lewis
(74) *Attorney, Agent, or Firm* — Klaus J. Bach (57) ABSTRACT

In a load shiftable group transmission with a high number of gears, particularly suitable for utility vehicles, the transmission includes a dual clutch a split unit, a direct gear, a main group and a hollow shaft on a countershaft in an arrangement, wherein the various gear stages can be established by a change of the input constants within the split unit without a change in the transmission stage in the main transmission without an interruption in tractive force during shifting between two adjacent gears within the main group.

19 Claims, 12 Drawing Sheets

| Gear | K1 | K2 | S1 | | | S2 | | S3 | | | S4 | | | S5 | |
|------|----|----|----|----|----|----|----|----|----|----|----|----|----|----|----|
| | | | v | vh | h | N | h | v | N | h | v | N | h | v | h |
| V1 | ● | | | ● | | ○ | | | | ● | | ○ | | ● | |
| V2 | | ● | | ● | | ○ | | | | ● | | ○ | | ● | |
| V3 | ● | | ● | | | ○ | | | ○ | | | | | ● | ● |
| V4 | | ● | | | ● | ○ | | | ○ | | | | | ● | ● |
| V5 | ● | | | | ● | ○ | | ● | | | | ○ | | ● | |
| V6 | | ● | ● | | | ○ | | ● | | | | ○ | | ● | |
| V7 | ● | | ● | | | | ● | | ○ | | | ○ | | ● | |
| V8 | | ● | | ● | | | ● | | ○ | | | ○ | | ● | |
| V9 | ● | | ● | | | ○ | | | | ● | | ○ | | | ● |
| V10 | | ● | ● | | | ○ | | | | ● | | ○ | | | ● |
| V11 | ● | | ● | | | ○ | | | ○ | | | | | ● | ● |
| V12 | | ● | | | ● | ○ | | | ○ | | | | | ● | ● |
| V13 | ● | | | | ● | ○ | | ● | | | | ○ | | | ● |
| V14 | | ● | ● | | | ○ | | ● | | | | ○ | | | ● |
| V15 | ● | | ● | | | | ● | | ○ | | | ○ | | | ● |
| V16 | | ● | | ● | | | ● | | ○ | | | ○ | | | ● |
| R1 | ● | | ● | | | ○ | | | ○ | | ● | | | ● | |
| R2 | | ● | ● | | | ○ | | | ○ | | ● | | | ● | |
| R3 | ● | | ● | | | ○ | | | ○ | | ● | | | | ● |
| R4 | | ● | ● | | | ○ | | | ○ | | ● | | | | ● |

Fig. 18

| Gear | K1 | K2 | S1 v | S1 vh | S1 h | S2 N | S2 h | S3 v | S3 N | S3 h | S4 v | S4 N | S4 h | S5 v | S5 h |
|------|----|----|------|-------|------|------|------|------|------|------|------|------|------|------|------|
| C1 | ● |   |      | ●     |      | ○    |      |      |      | ●    |      | ○    |      | ●    |      |
| C2 |   | ● |      | ●     |      | ○    |      |      |      | ●    |      | ○    |      | ●    |      |
| V1 | ● |   |      | ●     |      | ○    |      |      | ○    |      |      |      |      | ●    | ●    |
| V2 |   | ● |      |       | ●    | ○    |      |      | ○    |      |      |      |      | ●    | ●    |
| V3 | ● |   |      |       | ●    | ○    |      | ●    |      |      |      | ○    |      | ●    |      |
| V4 |   | ● | ●    |       |      | ○    |      | ●    |      |      |      | ○    |      | ●    |      |
| V5 | ● |   |      | ●     |      |      | ●    |      | ○    |      |      | ○    |      | ●    |      |
| V6 |   | ● |      | ●     |      |      | ●    |      | ○    |      |      | ○    |      | ●    |      |
| V7 | ● |   |      | ●     |      | ○    |      |      | ○    |      |      |      | ●    |      | ●    |
| V8 |   | ● |      | ●     |      | ○    |      |      | ○    |      |      |      | ●    |      | ●    |
| V9 | ● |   |      |       | ●    | ○    |      | ●    |      |      |      | ○    |      |      | ●    |
| V10 |   | ● |      |       | ●    | ○    |      | ●    |      |      |      | ○    |      |      | ●    |
| V11 | ● |   |      |       | ●    |      | ●    |      | ○    |      |      | ○    |      |      | ●    |
| V12 |   | ● |      |       | ●    |      | ●    |      | ○    |      |      | ○    |      |      | ●    |
| R1 | ● |   |      | ●     |      | ○    |      |      | ○    |      | ●    |      |      | ●    |      |
| R2 |   | ● |      | ●     |      | ○    |      |      | ○    |      | ●    |      |      | ●    |      |
| R3 | ● |   |      | ●     |      | ○    |      |      | ○    |      | ●    |      |      |      | ●    |
| R4 |   | ● |      | ●     |      | ○    |      |      | ○    |      | ●    |      |      |      | ●    |

| Gear | C1 | C2 | C3 | C4 | V1 | V2 | V3 | V4 | V5 | V6 | V7 | V8 | V9 | V10 | V11 | V12 |
|---|---|---|---|---|---|---|---|---|---|---|---|---|---|---|---|---|
| Transmission Ratio | 12,93 | 10,77 | 8,98 | 7,48 | 6,23 | 5,20 | 4,33 | 3,61 | 3,01 | 2,51 | 2,09 | 1,74 | 1,45 | 1,20 | 1,0 | 0,83 |
| Progressive Ratio | 1,20 | 1,20 | 1,20 | 1,20 | 1,20 | 1,20 | 1,20 | 1,20 | 1,20 | 1,20 | 1,20 | 1,20 | 1,20 | 1,20 | 1,20 | |

Fig. 23

| Gear | C1 | C2 | C3 | C4 | V1 | V2 | V3 | V4 | V5 | V6 | V7 | V8 | V9 | V10 | V11 | V12 |
|---|---|---|---|---|---|---|---|---|---|---|---|---|---|---|---|---|
| Transmission Ratio | 14,53 | 12,11 | 8,98 | 7,48 | 6,23 | 5,20 | 4,33 | 3,61 | 3,01 | 2,51 | 2,09 | 1,74 | 1,45 | 1,20 | 1,0 | 0,83 |
| Progressive Ratio | 1,20 | 1,35 | 1,20 | 1,20 | 1,20 | 1,20 | 1,20 | 1,20 | 1,20 | 1,20 | 1,20 | 1,20 | 1,20 | 1,20 | 1,20 | |

Fig. 24

| Gear | C1 | C2 | C3 | C4 | V1 | V2 | V3 | V4 | V5 | V6 | V7 | V8 | V9 | V10 | V11 | V12 |
|---|---|---|---|---|---|---|---|---|---|---|---|---|---|---|---|---|
| Transmission Ratio | 16,35 | 13,62 | 10,09 | 8,41 | 6,23 | 5,20 | 4,33 | 3,61 | 3,01 | 2,51 | 2,09 | 1,74 | 1,45 | 1,20 | 1,0 | 0,83 |
| Progressive Ratio | 1,20 | 1,35 | 1,20 | 1,35 | 1,20 | 1,20 | 1,20 | 1,20 | 1,20 | 1,20 | 1,20 | 1,20 | 1,20 | 1,20 | 1,20 | |

Fig. 25

| Gear | C1 | C2 | C3 | C4 | V1 | V2 | V3 | V4 | V5 | V6 | V7 | V8 | V9 | V10 | V11 | V12 |
|---|---|---|---|---|---|---|---|---|---|---|---|---|---|---|---|---|
| Transmission Ratio | 15,73 | 13,12 | 9,71 | 8,10 | 6,00 | 5,00 | 4,16 | 3,47 | 2,89 | 2,41 | 2,09 | 1,74 | 1,45 | 1,20 | 1,0 | 0,83 |
| Progressive Ratio | 1,20 | 1,35 | 1,20 | 1,35 | 1,20 | 1,20 | 1,20 | 1,20 | 1,20 | 1,15 | 1,20 | 1,20 | 1,20 | 1,20 | 1,20 | |

| Gear | K1 | K2 | S1 v | S1 vh | S1 h | S2 N | S2 h | S3 v | S3 N | S3 h | S4 v | S4 N | S4 h | S5 v | S5 h |
|---|---|---|---|---|---|---|---|---|---|---|---|---|---|---|---|
| 1 | ● |   | ● |   |   | ○ |   |   |   | ● |   | ○ |   | ● |   |
| 2 |   | ● | ● |   |   | ○ |   |   |   | ● |   | ○ |   | ● |   |
| 3 | ● |   | ● |   |   |   | ● |   | ○ |   |   | ○ |   | ● |   |
| 4 |   | ● | ● |   |   |   | ● |   | ○ |   |   | ○ |   | ● |   |
| 5 | ● |   | ● |   |   | ○ |   |   | ○ |   |   |   |   | ● | ● |
| 6 |   | ● |   |   | ● | ○ |   |   | ○ |   |   |   |   | ● | ● |
| 7 | ● |   |   |   | ● | ○ |   | ● |   |   |   | ○ |   |   | ● |
| 8 |   | ● |   | ● |   | ○ |   | ● |   |   |   | ○ |   |   | ● |
| 9 | ● |   |   | ● |   |   |   |   | ○ |   |   | ○ |   |   | ● |
| 10 |   | ● | ● |   |   |   |   | ● |   |   |   | ○ |   |   | ● |
| 11 | ● |   | ● |   |   | ○ |   |   |   | ● |   | ○ |   | ● |   |
| 12 |   | ● | ● |   |   | ○ |   |   |   | ● |   | ○ |   | ● |   |
| 13 | ● |   | ● |   |   |   | ● |   | ○ |   |   | ○ |   | ● |   |
| 14 |   | ● | ● |   |   |   | ● |   | ○ |   |   | ○ |   | ● |   |
| 15 | ● |   | ● |   |   | ○ |   |   | ○ |   |   |   |   | ● | ● |
| 16 |   | ● |   |   | ● | ○ |   |   | ○ |   |   |   |   | ● | ● |
| 17 | ● |   |   |   | ● | ○ |   | ● |   |   |   | ○ |   |   | ● |
| 18 |   | ● | ● |   |   | ○ |   | ● |   |   |   | ○ |   |   | ● |
| 19 | ● |   |   | ● |   |   |   |   | ○ |   |   | ○ |   |   | ● |
| 20 |   | ● |   | ● |   |   |   | ● | ○ |   |   | ○ |   |   | ● |
| R1 | ● |   | ● |   |   | ○ |   |   | ○ |   | ● |   |   | ● |   |
| R2 |   | ● | ● |   |   | ○ |   |   | ○ |   | ● |   |   | ● |   |
| R3 | ● |   | ● |   |   | ○ |   |   | ○ |   | ● |   |   |   | ● |
| R4 |   | ● | ● |   |   | ○ |   |   | ○ |   | ● |   |   |   | ● |

Fig. 26

| Gear | K1 | K2 | S1 | | | S2 | | S3 | | | S4 | | | S5 | |
|---|---|---|---|---|---|---|---|---|---|---|---|---|---|---|---|
| | | | v | vh | h | N | h | v | N | h | v | N | h | v | h |
| C1 | ● | | | ● | | ○ | | | | ● | | ○ | | ● | |
| C2 | | ● | | ● | | ○ | | | | ● | | ○ | | ● | |
| 1 | ● | | | ● | | | ● | | ○ | | | ○ | | ● | |
| 2 | | ● | | ● | | | ● | | ○ | | | ○ | | ● | |
| 3 | ● | | ● | | | ○ | | | ○ | | | | | ● | ● |
| 4 | | ● | | | ● | ○ | | | ○ | | | | | ● | ● |
| 5 | ● | | | | ● | ○ | | ● | | | | ○ | | ● | |
| 6 | | ● | ● | | | ○ | | ● | | | | ○ | | ● | |
| 7 | ● | | ● | | | | ● | | ○ | | | ○ | | ● | |
| 8 | | ● | ● | | | | ● | | ○ | | | ○ | | ● | |
| 9 | ● | | ● | | | ● | | | ○ | | | ○ | | ● | |
| 10 | | ● | ● | | | ● | | | ○ | | | ○ | | ● | |
| 11 | ● | | | ● | | ○ | | | ○ | | | | | ● | ● |
| 12 | | ● | | ● | | ○ | | | ○ | | | | | ● | ● |
| 13 | ● | | | | ● | ○ | | ● | | | | ○ | | ● | ● |
| 14 | | ● | ● | | | ○ | | ● | | | | ○ | | ● | ● |
| 15 | ● | | ● | | | | ● | | ○ | | | ○ | | ● | ● |
| 16 | | ● | | ● | | | ● | | ○ | | | ○ | | ● | ● |
| R1 | ● | | | ● | | ○ | | | ○ | | ● | | | ● | |
| R2 | | ● | | ● | | ○ | | | ○ | | ● | | | ● | |
| R3 | ● | | | ● | | ○ | | | ○ | | ● | | | | ● |
| R4 | | ● | | ● | | ○ | | | ○ | | ● | | | | ● |

Fig. 27

| Gear | K1 | K2 | S1 | | | S2 | | S3 | | | S4 | | | S5 | |
|---|---|---|---|---|---|---|---|---|---|---|---|---|---|---|---|
| | | | v | vh | h | N | h | v | N | h | v | N | h | v | h |
| C1 | ● | | | ● | | ○ | | | | ● | | ○ | | ● | |
| C2 | | ● | | ● | | ○ | | | | ● | | ○ | | ● | |
| C3 | ● | | | ● | | | | ● | ○ | | | ○ | | ● | |
| C4 | | ● | | ● | | | ● | | ○ | | | ○ | | ● | |
| 1 | ● | | | ● | | ○ | | | ○ | | | | | ● | ● |
| 2 | | ● | | ● | | ○ | | | ○ | | | | | ● | ● |
| 3 | ● | | | ● | | ○ | | ● | | | | ○ | | ● | |
| 4 | | ● | ● | | | ○ | | ● | | | | ○ | | ● | |
| 5 | ● | | ● | | | | ● | | ○ | | | ○ | | ● | |
| 6 | | ● | ● | | | | ● | | ○ | | | ○ | | ● | |
| 7 | ● | | | ● | | ○ | | | ○ | | | | | ● | ● |
| 8 | | ● | | ● | | ○ | | | ○ | | | | | ● | ● |
| 9 | ● | | | ● | | ○ | | ● | | | | ○ | | ● | ● |
| 10 | | ● | ● | | | ○ | | ● | | | | ○ | | ● | ● |
| 11 | ● | | ● | | | | ● | | ○ | | | ○ | | ● | ● |
| 12 | | ● | ● | | | | ● | | ○ | | | ○ | | ● | ● |
| R1 | ● | | | ● | | ○ | | | ○ | | ● | | | ● | |
| R2 | | ● | | ● | | ○ | | | ○ | | ● | | | ● | |
| R3 | ● | | | ● | | ○ | | | ○ | | ● | | | ● | |
| R4 | | ● | | ● | | ○ | | | ○ | | ● | | | ● | |

Fig. 28

DUAL CLUTCH GROUP TRANSMISSION SHIFTTABLE UNDER LOAD

This is a Continuation-in-Part Application of pending International patent application PCT/EP2006/008434 filed Aug. 29, 2006 and claiming the priority of German patent application 10 2005 044 068.1 filed Sep. 15, 2005.

BACKGROUND OF THE INVENTION

The invention relates to a dual clutch group transmission shiftable under load with the power transmitted via the two clutches to the two transmission groups via concentric shafts.

Figure 3:
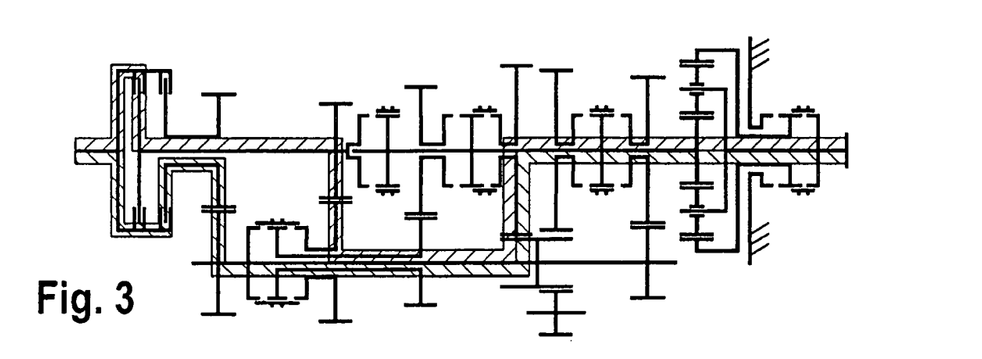
FIG. 3 shows the branched power path of the load-shiftable group transmission as per FIG. 1 during a changeover from the ninth forward gear being engaged to the tenth forward gear.

FIG. 3 of WO 00/39484 already discloses a load-shiftable group transmission having at least two input constants, including a countershaft and having a dual clutch comprising two individual clutches. One power path extends from the first individual clutch via a fifth gear, which is a direct gear, to a main shaft. The two forward gears IV and VI which are directly adjacent to the direct gear extend via the second individual clutch and the countershaft. A hollow shaft, which is arranged concentrically with respect to the countershaft, supports two gearwheels of which one gearwheel belongs to the input constant. A gearwheel, which is situated closest to the dual clutch, of the first input constant is a fixed wheel.

Figure 1:
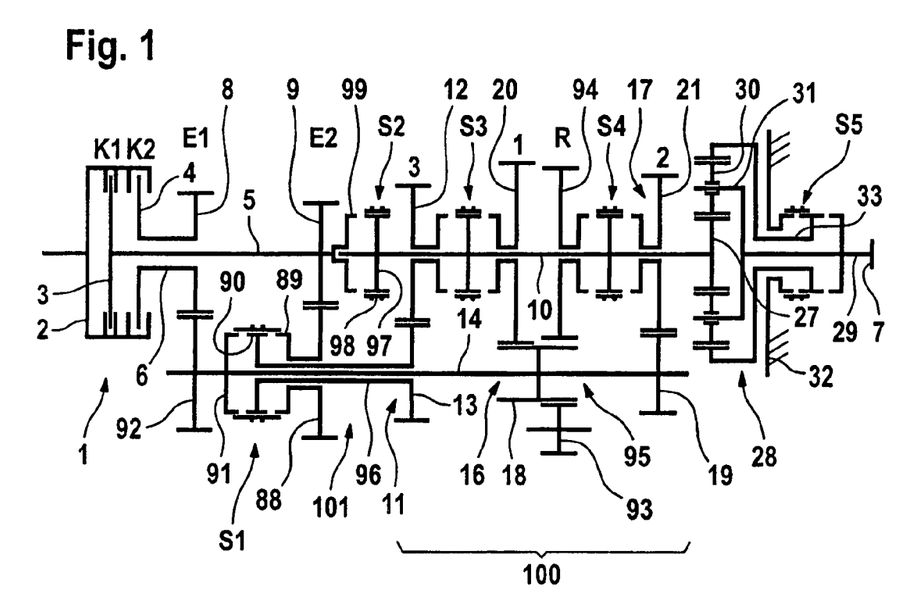
FIG. 1 shows, in a first embodiment, a load-shiftable group transmission which can be embodied as a 16-gear transmission or as a 12-gear transmission with two creep gears.

FIG. 1 of WO 00/39484 shows a load-shiftable group transmission in which the gearwheel, which is situated closest to the dual clutch, of the first input constant is a loose wheel. Here, the laod-shiftable group transmission has two second forward gears.

Further transmissions are disclosed in U.S. Pat. No. 6,460, 425 B, DE 103 38 355 A1, DE 43 30 170 A1, DE 35 46 454 C2 and DE 101 02 028 A1.

It is the object of the present invention to provide a laod-shiftable group transmission for utility vehicles which allows for a high number of sequentially load-shiftable gears.

SUMMARY OF THE INVENTION

In a load shiftable group transmission with a high number of gears, particularly suitable for utility vehicles, the transmission includes a dual clutch a split unit, a direct gear, a main group and a hollow shaft on a countershaft in an arrangement, wherein the various gear stages can be established by a change of the input constants within the split unit without a change in the transmission stage in the main transmission without an interruption in tractive force during shifting between two adjacent gears within the main group.

The load-shiftable group transmission described herein has a high number of gears and is therefore particularly suitable for utility vehicles. A splitter unit, a direct gear, a main group and a hollow shaft disposed on a countershaft are provided. It is firstly possible to shift without an interruption in tractive force between some gears by changing the input constants in the splitter unit without changing the transmission gear stage in the main transmission. Here, in contrast to conventional dual-clutch transmissions, shifts of this type extend via the same partial transmission or the same countershaft as illustrated in detail in DE 102005033027.4 which has not been published before the priority date of the present application. In this respect, the content of the application DE 102005033027.4 should also be considered in connection with the present application. In the present application, it is also possible to shift without an interruption in tractive force between two adjacent gears which are established by means of a change of the transmission ratio within the main group. In order to ensure said functionality, a hollow shaft is arranged coaxially with respect to the countershaft. Said hollow shaft therefore forms, for only a few gears, a second partial transmission which rotates independently of the countershaft, while, in the majority of the gears, the hollow shaft is rotationally fixedly coupled to the countershaft.

For said coupling, a specially-designed shift element may be provided. This shift element, which is provided on the countershaft, is particularly advantageously designed without any neutral position. Instead, the shift element can, in each of three possible positions, rotationally fixedly connect at least two transmission elements to one another. The transmission element may, in a first—in particular forward—position, interconnect the countershaft and a hollow shaft. In a central position, the transmission elements may interconnect the countershaft, the hollow shaft and a loose gear wheel. In a third position, the transmission elements may interconnect the hollow shaft and a gear loose wheel.

In a particularly advantageous embodiment of the load-shiftable group transmission with geometric stepping, there is at least approximately the same progressive ratio between the majority—in the extreme case even all—of the adjacent forward gears.

The invention will become more readily apparent from the following description of various embodiments thereof on the basis of the accompanying drawings.

DESCRIPTION OF THE VARIOUS EMBODIMENTS

FIG. 1 shows a load-shiftable group transmission which has, at the input side, a dry dual clutch 1 which is in the form of a friction clutch. A primary mass 2 of said dual clutch 1 is connected by means of a torsional damper to a crankshaft of a drive engine. In the following, the axial direction pointing toward the drive engine is referred to as "front", whereas the axial direction pointing toward a transmission output flange 7 is referred to as "rear". This corresponds to the installation direction in vehicles with rear-wheel drive and a front-mounted engine, as this installation direction is generally used in high-torque passenger vehicles and in utility vehicles. The primary mass 2 can alternatively be coupled in a frictionally engaging manner to two clutch disks 3, 4, of which the first clutch disk 3 belongs to a first individual clutch K1, whereas the second clutch disk 4 belongs to a second individual clutch K2. With the first individual clutch K1, the torque can be transmitted to an intermediate shaft which is in the form of an inner shaft 5 and which extends through a hollow intermediate shaft 6. The hollow intermediate shaft 6 forms a second intermediate shaft and is connected to the clutch disk 4 of the second individual clutch K2.

The hollow intermediate shaft 6 is rotationally fixedly connected at its right-hand end to a fixed wheel 8 which forms the input gearwheel of a first input constant E1. The inner shaft 5 which projects out of the hollow intermediate shaft 6 has, in succession, a fixed wheel 9 and a shift toothing 99. The fixed wheel 9 forms the input gearwheel of a second input constant E2. The shift toothing 99 is arranged at the end of the inner shaft 5 and can be rotationally fixedly coupled by means of a shift sleeve 98 to a synchronizing body 97 of a main shaft 10. The synchronizing body 97, the shift sleeve 98 and the shift toothing therefore form a second shift element S2. Here, the second shift element S2, in the foremost position v (FIGS. 18, 19), produces a rotationally fixed connection between the main shaft 10 and the inner shaft 5, whereby the direct gear is engaged. In a neutral position N of the second shift element S2, the inner shaft 5 is, in contrast, rotatably decoupled from the main shaft 10. Said two shift positions v, N can be seen, in addition to other shift positions, in the shift diagrams FIG. 18 and FIG. 19.

The two input constants E1 and E2 together form a split unit.

The main shaft 10 is situated coaxially or in alignment with respect to the inner shaft 5 and with respect to the hollow shaft 6. Here, the main shaft 10 is mounted by means of rolling bearings, in a way not illustrated in detail, at the front end with respect to the inner shaft 5. The second shift element S2 is followed on the main shaft 10 by a loose wheel 12. Said first loose wheel 12 meshes with a gearwheel 13 which is rotationally fixedly arranged on a hollow shaft 96. The first loose wheel 12 and the gearwheel 13 therefore form the first gearwheel stage 11 or transmission stage of a main group 100. Following behind this there are the second gearwheel stage 16 and the third gearwheel stage 17. The fixed wheels 18, 19 of said second gearwheel stage 16 and third gearwheel stage 17 are arranged on a countershaft 14 which is arranged coaxially with respect to the hollow shaft 96, whereas the loose wheels 20, 21 of said second gearwheel stage 16 and third gearwheel stage 17 are arranged on the main shaft 10. Arranged between said two gearwheel stages 16, 17 is a gearwheel stage 95 which is assigned to the reverse gear R and which shares the fixed wheel 18 with the gearwheel stage 16. For this purpose, the fixed wheel 18 is designed to be so wide as to project into the two gearwheel planes. Also arranged in the gearwheel plane of the reverse gear R is an intermediate wheel 93 which meshes firstly with the fixed gear 18 and secondly with the loose wheel 94. Said spatially arranged intermediate gear 93 is, for clarity, merely graphically illustrated folded in the plane of the drawing, and serves for rotational direction reversal.

Arranged between the first loose wheel 12 and the second loose wheel 20 is the third shift element S3, so that said third shift element S3, in the forward position v, establishes a rotationally fixed connection between the main shaft 10 and the loose wheel 12 and, in the rear position h, establishes a rotationally fixed connection between the main shaft 10 and the loose wheel 20. In the central position N, the third shift element S3 is in the neutral position.

Arranged between the loose wheel 94 of the reverse gear R and the loose wheel 21 which is arranged behind said loose wheel 94 is the fourth shift element S4. Said fourth shift element S4 is firstly movable into a forward position v in which it establishes a rotationally fixed connection between the main shaft and the loose wheel 94. Secondly, the fourth shift element S4 is movable into a rear position h in which it establishes a rotationally fixed connection between the main shaft 10 and the loose wheel 21. In addition, the shift element S4 is movable into a neutral position N.

The rearmost end of the main shaft 10 is connected to a sun gear 27 which forms the input element of a range group 28 which is embodied as a planetary gear set. A planet carrier 31 which supports a plurality of planets 30 is rotationally fixedly connected to the transmission output shaft 29 and the transmission output flange 7. Here, the transmission output shaft 29 projects through a partition 32 of the transmission housing for bearing support. The hollow wheel carrier shaft 33 likewise projects through the partition 32. Arranged at the transmission output side of the partition 32 is a fifth shift element S5, by means of which the hollow wheel support shaft 33 can selectively be connected to the partition 32, which is fixed to the transmission housing in a front position v, and to the transmission output shaft 29 in a rear position h. The fifth shift element S5 also has a central neutral position N.

The transmission-input-side fixed wheel 8 of the first input constant E1 meshes with a fixed wheel 92 which is coaxially rotationally fixedly arranged on the countershaft 14. Provided axially behind said fixed wheel 92 is a shift toothing 91 which corresponds to a synchronizing body toothing 90, which is rotationally fixedly arranged on said hollow shaft 96, and a shift toothing 89. The latter shift toothing 89 is rotationally fixedly arranged on a loose wheel 88 which is coaxially rotatably arranged on the hollow shaft 96. The shift toothing 91, the synchronizing body toothing 90 and the shift toothing 89 therefore form a shift element S1 which, in a forward position v, rotationally fixedly couples the hollow shaft 96 to the countershaft 14. In contrast, in a rear position h, the first shift element S1 couples the hollow shaft 96 to the loose wheel 88. In a central position vh, the first shift element S1 couples the hollow shaft 96 to the countershaft 14 and to the loose wheel 88, so that said three components are blocked. Since the shift element S1 therefore rotationally fixedly couples the loose wheel 88 and the gearwheel 13 to one another by means of the hollow shaft 96 both in the central position and also in the rear position, a double wheel 101 is formed by the loose wheel 88 and the gearwheel 13 in said two positions.

Figure 2:
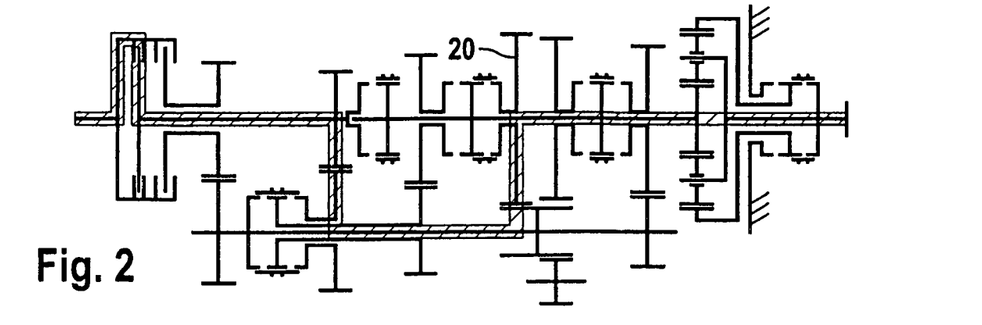
FIG. 2 shows the power path of the load-shiftable group transmission as per FIG. 1 with the ninth forward gear engaged.

FIG. 2 shows the power path of the load-shiftable group transmission as per FIG. 1 with the ninth gear V9 engaged. Here, the first shift element S1 is in said central position in which a rotationally fixed connection is created between the loose wheel 88 of the hollow shaft 96 and the countershaft 14. The second shift element S2 and the fourth shift element S4 are in the neutral position, whereas the third shift element S3 is moved into the rear position in which it establishes a rotationally fixed connection between the loose wheel 20 and the main shaft. The fifth shift element S5 is in the rear position. The first individual clutch K1 is engaged, whereas the second individual clutch K2 is disengaged. The power path in the ninth forward gear V9 therefore extends via the first individual clutch K1, the inner shaft 5, the second input constant E2, the countershaft 14, the wide fixed wheel 18, the loose wheel 20, the main shaft 10 and the blocked range group 28.

FIG. 3 shows the branched power path during a changeover from the ninth forward gear V9 being engaged to the tenth forward gear V10. The shift elements S1 to S5 are in an unchanged position in relation to FIG. 2. However, the two individual clutches K1 and K2 are partially engaged. The power path in the ninth forward gear V9 therefore extends corresponding to FIG. 2. In contrast, the power path in the additionally engaged tenth forward gear V10 extends via the second individual clutch K2, the first input constant E1, the countershaft 14, the wide fixed wheel 18, the loose wheel 20, the main shaft 10 and the blocked range group 28.

Figure 4:
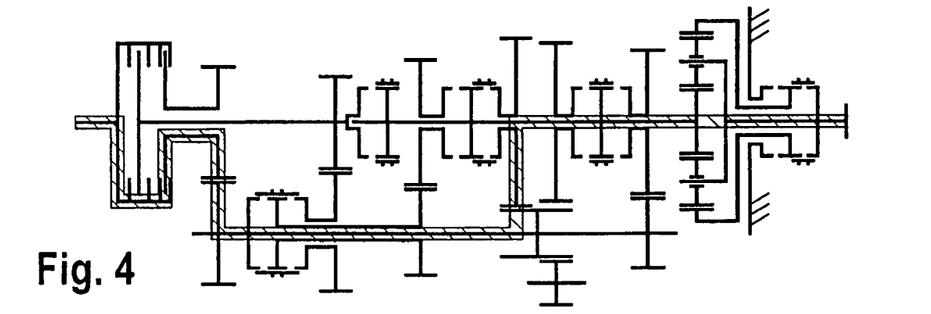
FIG. 4 shows the power path of the load-shiftable group transmission as per FIG. 1 with the tenth forward gear engaged.

FIG. 4 shows the power path with the tenth forward gear V10 engaged. Here, in contrast to FIG. 3, only the second clutch K2 is fully engaged, whereas the first clutch K1 is fully disengaged. The position of the shift elements S1 to S5 are as shown in FIG. 2 and FIG. 3.

Figure 5:
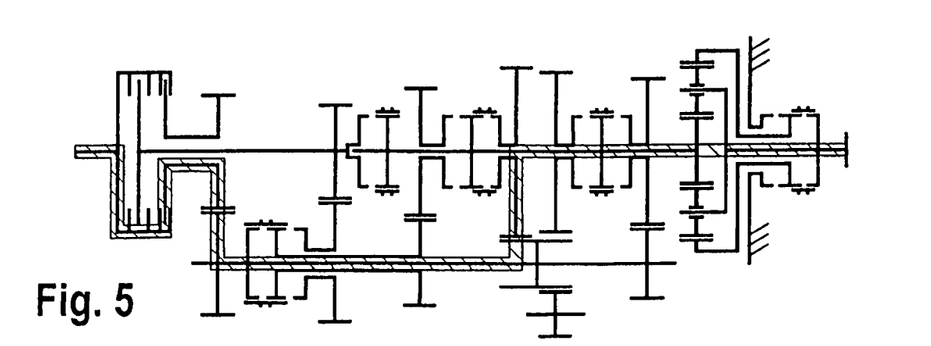
FIG. 5 shows the power path of the load-shiftable group transmission as per FIG. 1 with the tenth forward gear engaged and the second input constant E2 decoupled.

In order to avoid friction losses at the first individual clutch K1, the second input constant E2 is, as per FIG. 5, decoupled when the tenth forward gear V10 is engaged. For this purpose, during driving in the tenth forward gear, the first shift element S1 has been moved forward so that the loose wheel 88 is released from the countershaft 14 which is still coupled to the hollow shaft 96.

Figure 6:
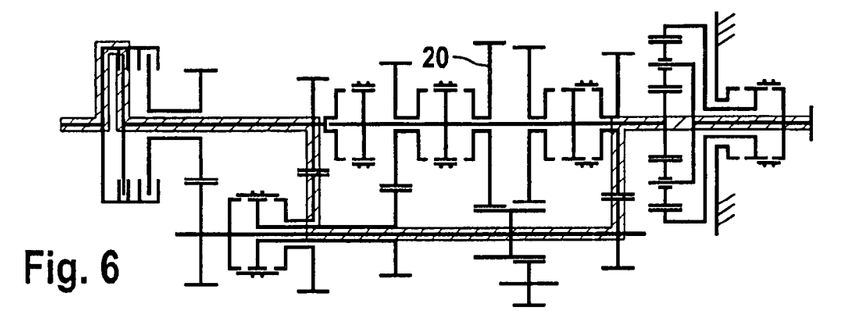
FIG. 6 shows the power path of the load-shiftable group transmission as per FIG. 1 with the eleventh forward gear engaged.

FIG. 6 shows the power path with the eleventh forward gear V11 engaged. Here, the first shift element S1 is again in the central position in which a rotationally fixed connection is established between the loose wheel 88, the hollow shaft 96 and the countershaft 14. The second shift element S2 and the third shift element S3 are in the neutral position, whereas the fourth shift element S4 has been moved into the rear position in which it establishes a rotationally fixed connection between the loose wheel 21 and the main shaft 10. The fifth shift element S5 is in the rear position. The first individual clutch K1 is engaged, whereas the second individual clutch K2 is disengaged. The power path in the eleventh forward gear V11 therefore extends via the first individual clutch K1, the inner shaft 5, the second input constant E2, the countershaft 14, the rearmost fixed wheel 19, the loose wheel 21, the main shaft 10 and the blocked range group 28.

Figure 7:
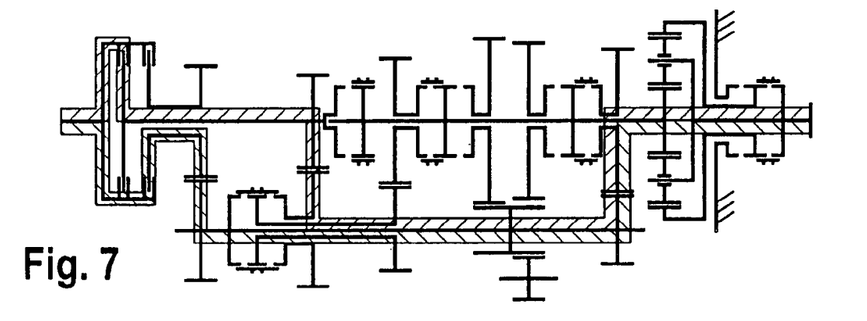
FIG. 7 shows the branched power path of the load-shiftable group transmission as per FIG. 1 during a changeover from the eleventh forward gear being engaged to the twelfth forward gear.

FIG. 7 shows the branched power path during a changeover from the eleventh forward gear V11 being engaged to the twelfth forward gear V12. With the exception of the third shift element S3, the shift elements are in an unchanged position in relation to FIG. 2. The third shift element S3 has been engaged in preparation for the changeover illustrated in FIG. 7. The two individual clutches K1 and K2 are partially engaged. The power path in the eleventh forward gear V11 therefore extends as shown in FIG. 6. In contrast, the power path in the additionally engaged twelfth forward gear V12 extends via the second individual clutch K2, the first input constant E1, the countershaft 14, the fixed wheel 19, the loose wheel 21, the main shaft 10 and the blocked range group 28.

Figure 8:
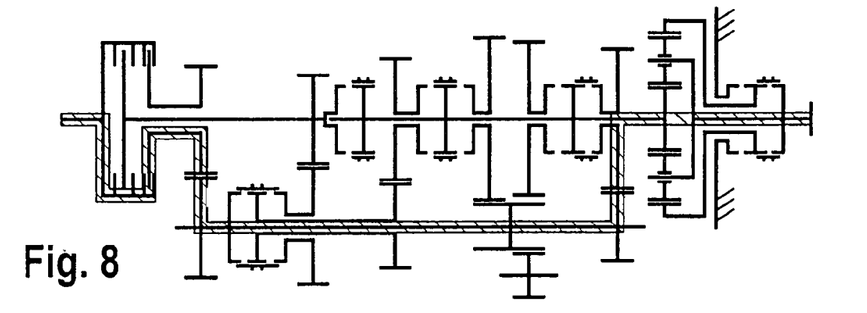
FIG. 8 shows the power path of the load-shiftable group transmission as per FIG. 1 with the twelfth forward gear engaged.

FIG. 8 shows the power path with the twelfth forward gear V12 engaged. Here, in contrast to FIG. 7, only the second clutch K2 is fully engaged, whereas the first clutch K1 is fully disengaged. The position of the shift elements S1 to S5 is identical to FIG. 7.

Figure 9:
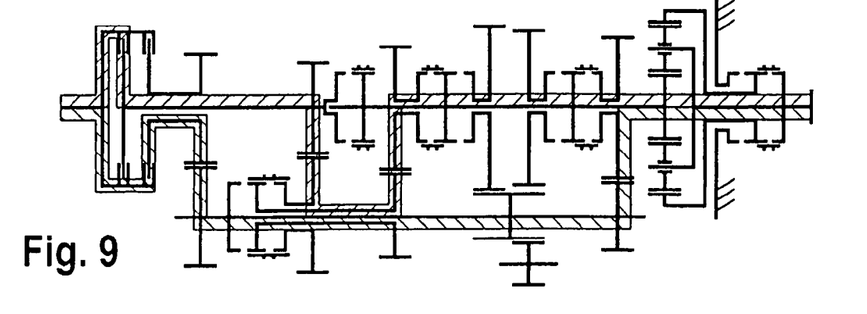
FIG. 9 shows the branched power path of the load-shiftable group transmission as per FIG. 1 during a changeover from the twelfth forward gear being engaged to the thirteenth forward gear.

FIG. 9 shows the branched power path during a changeover from the twelfth forward gear V12 being engaged to the thirteenth forward gear V13. The first shift element S1 has been moved rearward with respect to FIG. 8, whereas the third shift element S3 has been moved forward with respect to FIG. 8. The rest of the shift elements S2, S4, S5 are in an unchanged position in relation to FIG. 8. The two individual clutches K1 and K2 are partially engaged. The power path in the twelfth forward gear V12 therefore extends corresponding to that shown in FIG. 8. In contrast, the power path in the additionally engaged thirteenth forward gear V13 extends via the first individual clutch K1, the second input constant E2, the hollow shaft 96 which is coupled to the countershaft 14 by means of the first shift element S1, the gearwheel 13, the loose wheel 12, the main shaft 10 and the blocked range group 28.

Figure 10:
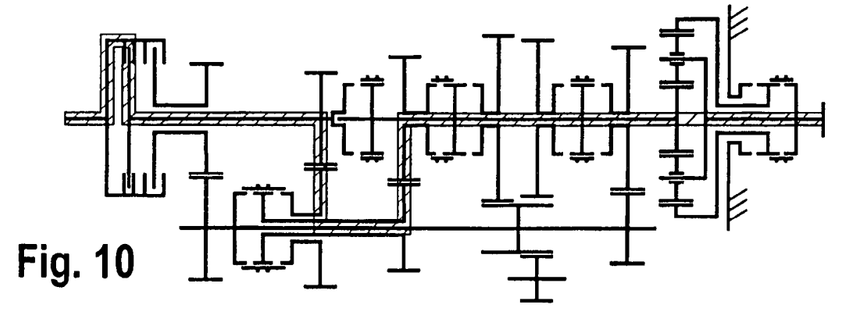
FIG. 10 shows the power path of the load-shiftable group transmission as per FIG. 1 with the thirteenth forward gear engaged.

FIG. 10 shows the power path of the load-shiftable group transmission as per FIG. 1 with the thirteenth forward gear V13 engaged. In contrast to FIG. 9, the first shift element S1 has been moved into the central position, while the fourth shift element S4 has been moved into the central neutral position. The power path in the thirteenth forward gear V13 therefore runs corresponds to that shown in FIG. 9 with the clutch K2 disengaged.

Figure 11:
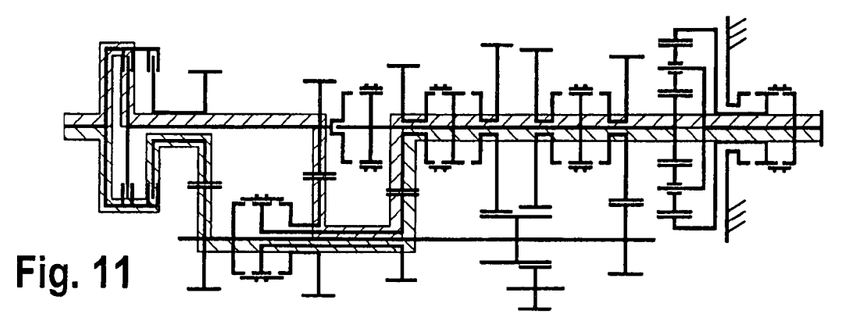
FIG. 11 shows the branched power path of the load-shiftable group transmission as per FIG. 1 during a changeover from the thirteenth forward gear being engaged to the fourteenth forward gear.

FIG. 11 shows the branched power path during a changeover from the thirteenth forward gear V13 being engaged to the fourteenth forward gear V14. All the shift elements S1 to S5 are in an unchanged position in relation to FIG. 10. The two individual clutches K1 and K2 are partially engaged. The power path in the thirteenth forward gear V13 therefore extends corresponding to that of FIG. 10. In contrast however, the power path in the additionally engaged fourteenth forward gear V14 extends via the second individual clutch K2, the first input constant E1, the countershaft 14 or the hollow shaft 96 which is rotationally fixedly coupled thereto, the gearwheel 13, the loose wheel 12, the main shaft 10 and the blocked range group 28.

Figure 12:
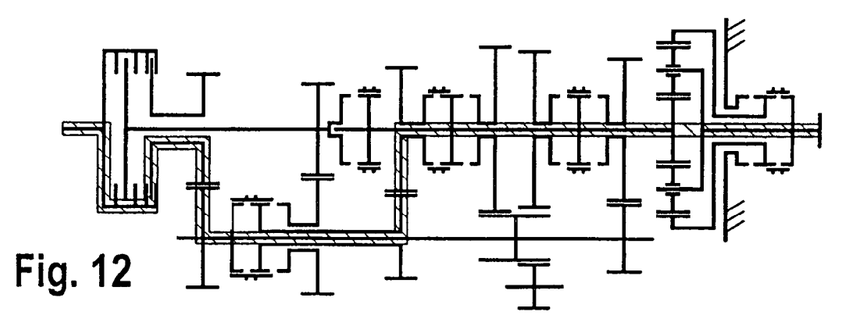
FIG. 12 shows the power path of the load-shiftable group transmission as per FIG. 1 with the fourteenth forward gear engaged.

FIG. 12 shows the power path with the fourteenth forward gear V14 engaged. Here, in contrast to FIG. 11, only the second clutch K2 is fully engaged, whereas the first clutch K1 is fully disengaged. The position of the shift elements S1 to S5 is identical to FIG. 11.

Figure 13:
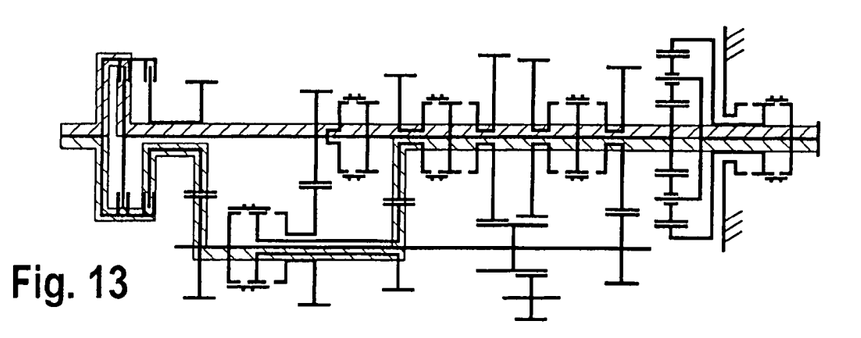
FIG. 13 shows the branched power path of the load-shiftable group transmission as per FIG. 1 during a changeover from the fourteenth forward gear being engaged to the fifteenth forward gear.

FIG. 13 shows the branched power path during a changeover from the fourteenth forward gear V14 being engaged to the fifteenth forward gear V15. The first shift element S1 has been moved rearward with respect to FIG. 12, whereas the second shift element S2 has been moved forward with respect to FIG. 12 in order to engage the direct gear. The rest of the shift elements S3, S4, S5 are in an unchanged position in relation to FIG. 12. The two individual clutches K1 and K2 are partially engaged. The power path in the fourteenth forward gear V14 therefore extends corresponding to that shown in FIG. 12. In contrast however, the power path in the additionally engaged fifteenth forward gear V15—that is to say in the direct gear—extends via the first individual clutch K1, the inner shaft 5, the main shaft 10 and the blocked range group 28 to the transmission output shaft 29.

Figure 14:
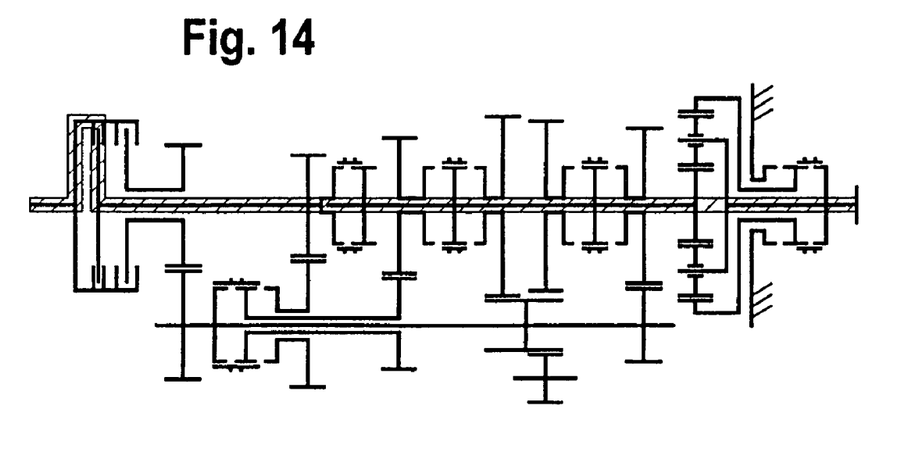
FIG. 14 shows the power path of the load-shiftable group transmission as per FIG. 1 with the fifteenth forward gear engaged.

After the complete opening of the second individual clutch K2, or alternatively shortly before the complete opening of the second individual clutch K2, the third shift element S3 is, as per FIG. 14, moved into the central neutral position. The direct gear is therefore engaged, with the countershaft 14 being decoupled. Only the hollow shaft 96 is dragged along by way of two toothing pairs.

Figure 15:
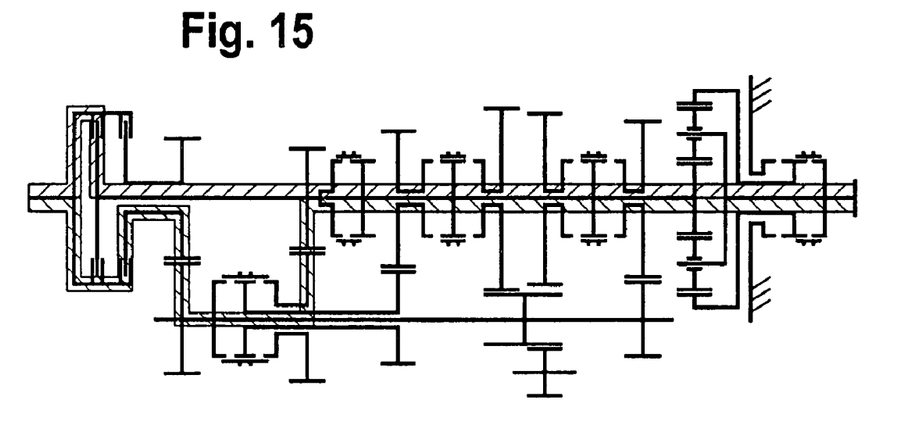
FIG. 15 shows the branched power path of the load-shiftable group transmission as per FIG. 1 during a changeover from the fifteenth forward gear being engaged to the sixteenth forward gear.

FIG. 15 shows the branched power path during a changeover from the direct gear being engaged to the sixteenth—and highest—forward gear V16. With the exception of the first shift element S1, the shift elements are in an unchanged position in relation to FIG. 14. The two individual clutches K1 and K2 are partially engaged. The power path in the direct gear therefore extends corresponding to that shown in FIG. 14. In contrast, the power path in the additionally engaged sixteenth forward gear V16 extends via the second individual clutch K2, the first input constant E1, the countershaft 14 or the hollow shaft 96 which is rotationally fixedly coupled thereto, the second input constant E2, the second shift element S2, the main shaft 10 and the blocked range group 28.

Figure 16:
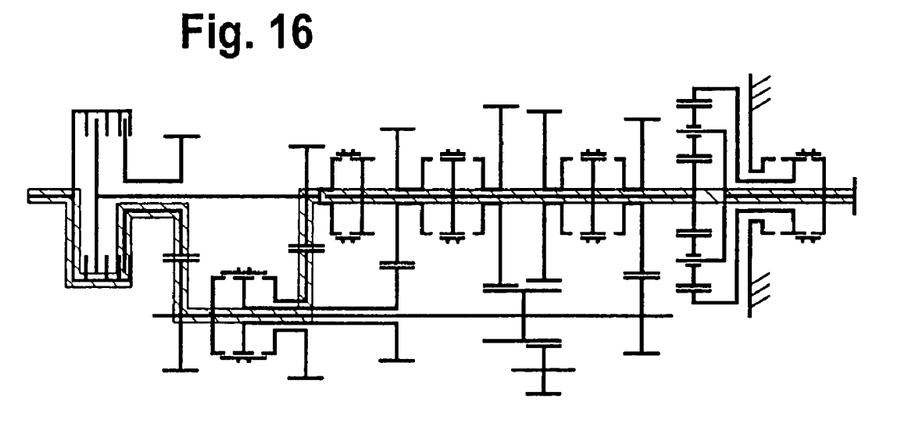
FIG. 16 shows the power path of the load-shiftable group transmission as per FIG. 1 with the sixteenth forward gear engaged.

FIG. 16 shows the power path with the sixteenth forward gear V16 fully engaged. Here, in contrast to FIG. 15, only the second clutch K2 is fully engaged, whereas the first clutch K1 is fully disengaged. The position of the shift elements S1 to S5 is therefore identical to FIG. 11.

In FIG. 2 to FIG. 16, only the forward gears V9 to V16 are illustrated, since the first eight forward gears V1 to V8 differ merely in the shift position of the range group 28.

Figure 17:
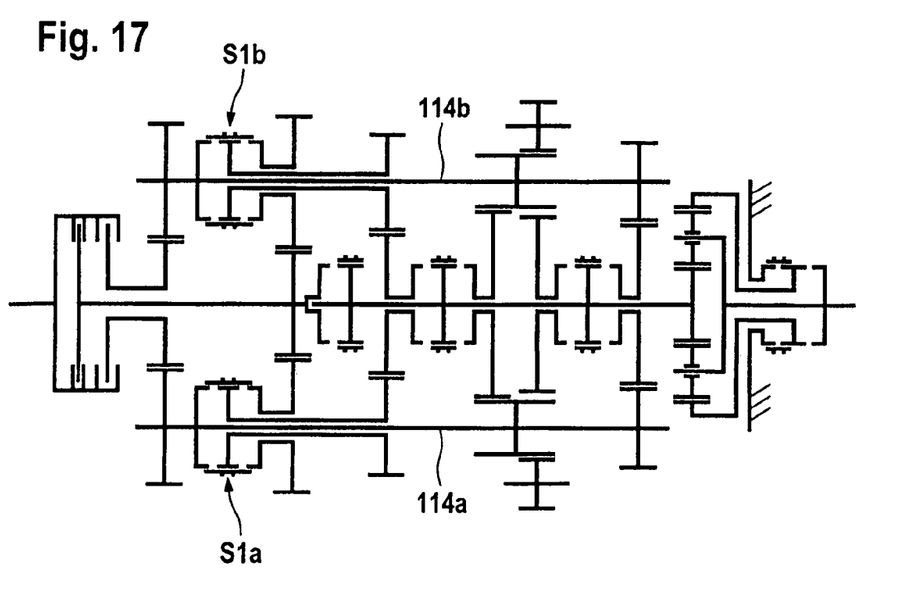
FIG. 17 shows, in a second embodiment, a load-shiftable group transmission which is of similar design to FIG. 1 but with two identical countershafts.

FIG. 17 shows, in a second embodiment, a load-shiftable group transmission which is of similar design to the load-shiftable group transmission as per FIG. 1 to FIG. 16. Instead of the one countershaft 14 provided in FIG. 1, however, two identical countershafts 114$a$, 114$b$ are provided. The two countershafts 114$a$, 114$b$ have identically-designed shift elements S1$a$, S1$b$. Said two shift elements S1$a$, S1$b$ perform the function of the shift element S1 as per FIG. 1 and are actuated in parallel in terms of time, for which purpose for example a single actuating element can be provided. The use of two countershafts 114$a$, 114$b$ reduces the bearing reaction forces, so that the bearing friction and the shaft bending is reduced in relation to the exemplary embodiment as per FIG. 1 and the transmission housing can be of smaller dimensions.

Figure 18:
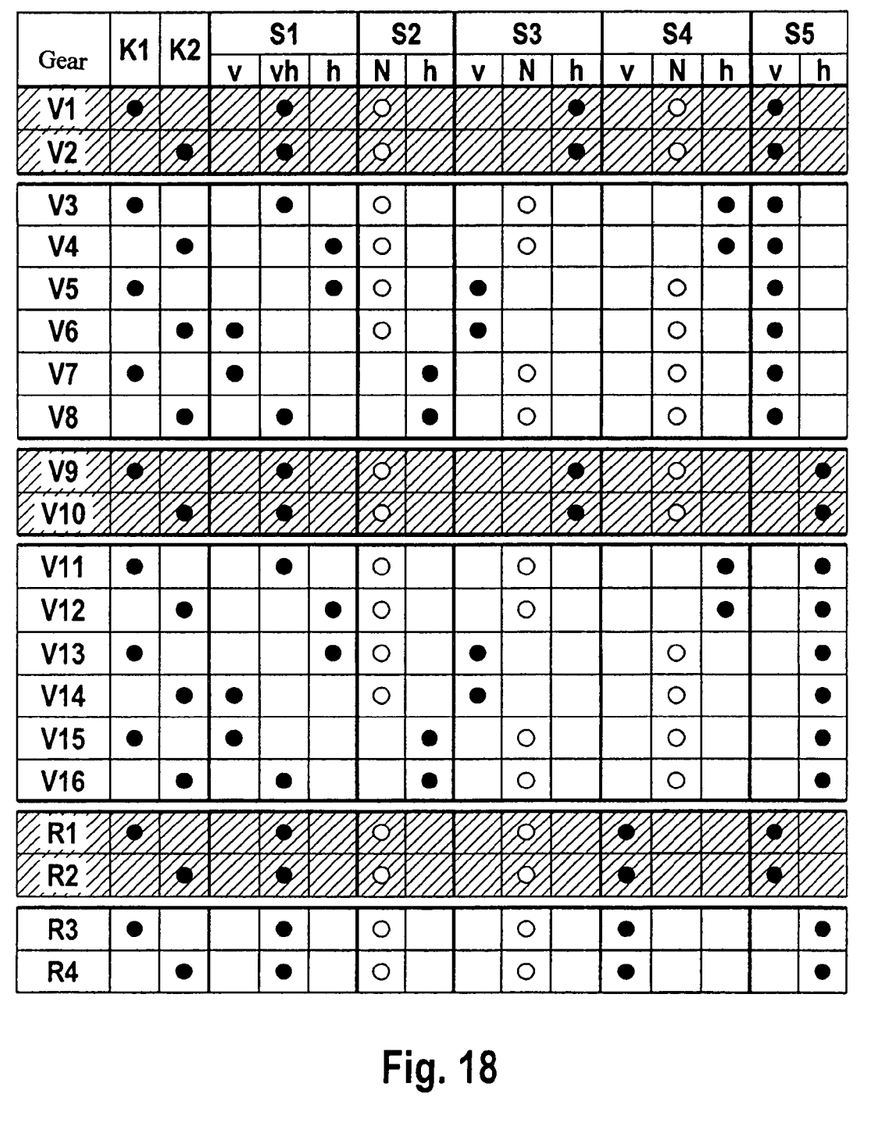
FIG. 18 shows a shift diagram of the load-shiftable group transmission as per FIG. 1 or FIG. 17 if the latter is embodied as a 16-gear transmission.

FIG. 18 shows a shift diagram of the similarly constructed load-shiftable group transmissions as per FIG. 1 and FIG. 17 if they are designed as 16-gear transmissions. Here, the forward gears V1 to V16 are illustrated in successive rows. The reverse gears R1 to R4 are illustrated in the subsequent rows. The hatched rows represent first gear groups of sequentially load-shiftable forward and reverse gears V1, V2 and V9, V10 and R1, R2. The non-hatched rows represent second gear groups of sequentially load-shiftable forward and reverse gears V3 to V8, V11 to V16 and R3, R4. Here, the gear groups are arranged in an alternating fashion, so that a first gear group is followed by a second gear group which is in turn followed by a first gear group. It is not possible to perform sequential power-shifts between two different gear groups—that is to say between a first and a second gear group or between a second gear group and a first gear group. Said transitions without the possibility of power-shifting are illustrated by means of double lines. The columns illustrate, in succession, the shift states of the first individual clutch K1, of the second individual clutch K2, of the first shift element S1, of the second shift element S2, of the third shift element S3, of the fourth shift element S4 and of the fifth shift element S5. For each of the shift elements S1 to S5, separate columns illustrate the position in which the respective shift element is engaged in each gear, which also gives the number of possible positions per shift element. Here, "v" denotes the forward position of one of the shift elements S1, S3 to S5 or S1$a$, S1$b$, "h" denotes the rearward position of one of the shift elements S1 to S5 or S1$a$, S1$b$, "vh" denotes the central position of the shift element S1 or S1$a$, S1$b$ and "N" denotes the neutral position of one of the shift elements S2 to S4.

Figure 19:
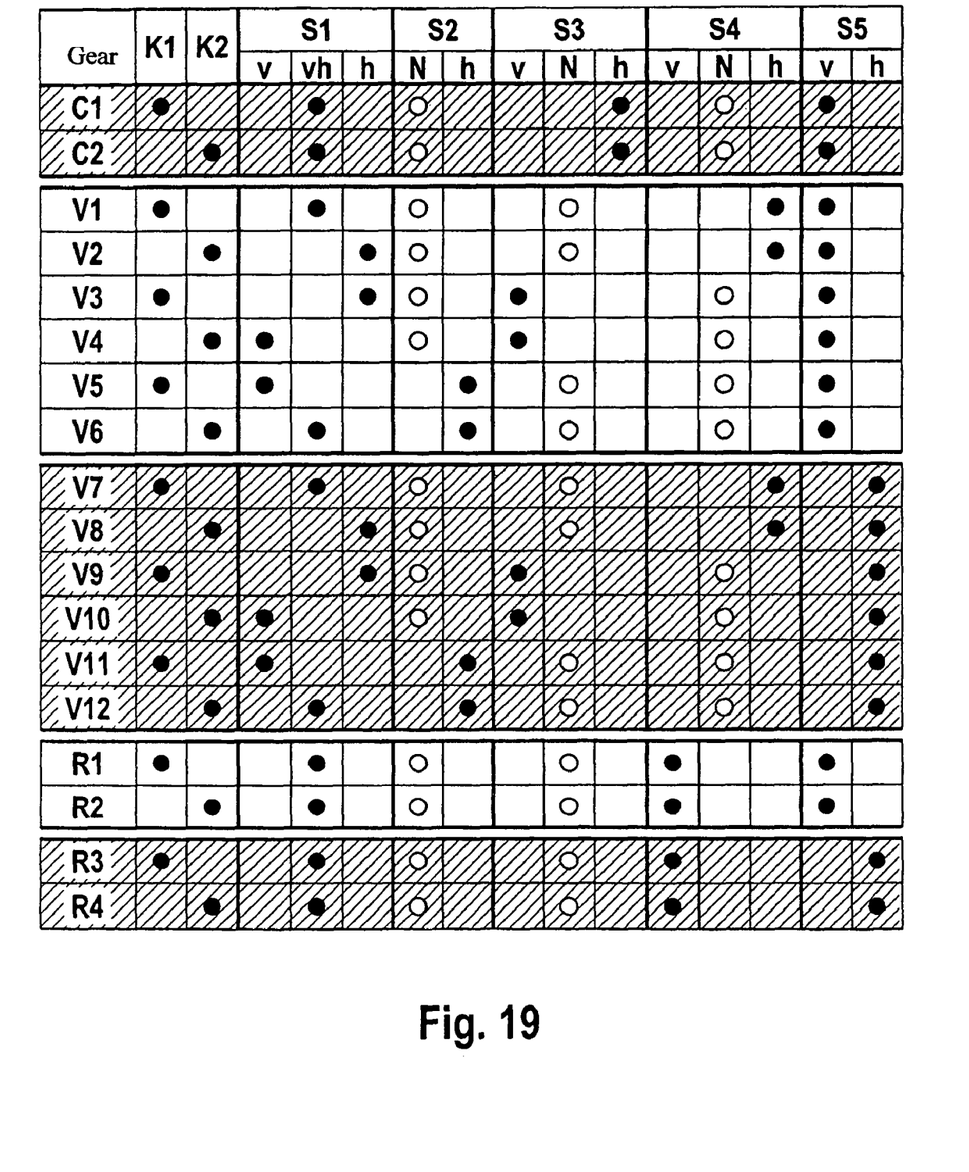
FIG. 19 shows a shift diagram of the load-shiftable group transmission as per FIG. 1 or FIG. 17 if the latter is embodied as a 12-gear transmission with two creep gears.

FIG. 19 shows a shift diagram of the similarly constructed load-shiftable group transmissions as per FIG. 1 and FIG. 17 if the latter are designed as 12-gear transmissions with two creep gears C1 and C2. The denotations are otherwise analogous to FIG. 18.

In the embodiment with two creep gears C1, C2 and twelve forward gears V1 to V12, the transmission ratio of the gear-wheel pairing with the highest transmission ratio—that is to say fixed wheel 18 and loose wheel 20—can be selected within the main group 100, in such a way that there is a greater progressive ratio between the second creep gear C2 and the first forward gear V1 than between the other in each case adjacent forward gears. In this way, a greater overall spread of the transmission gear ratios is obtained.

In addition, the progressive ratio between the final forward gear V6 of the small gear group and the first forward gear V7 of the large gear group can be selected to be greater than the rest of the progressive ratios. This then results in a large overall spread.

Alternatively, the progressive ratio between the final forward gear V6 of the small gear group and the first forward gear V7 of the large gear group can be selected to be lower than the rest of the progressive ratios. This results in a better shifting capability, since an interruption in tractive force is in any case unavoidable here out of principle.

Figure 20:
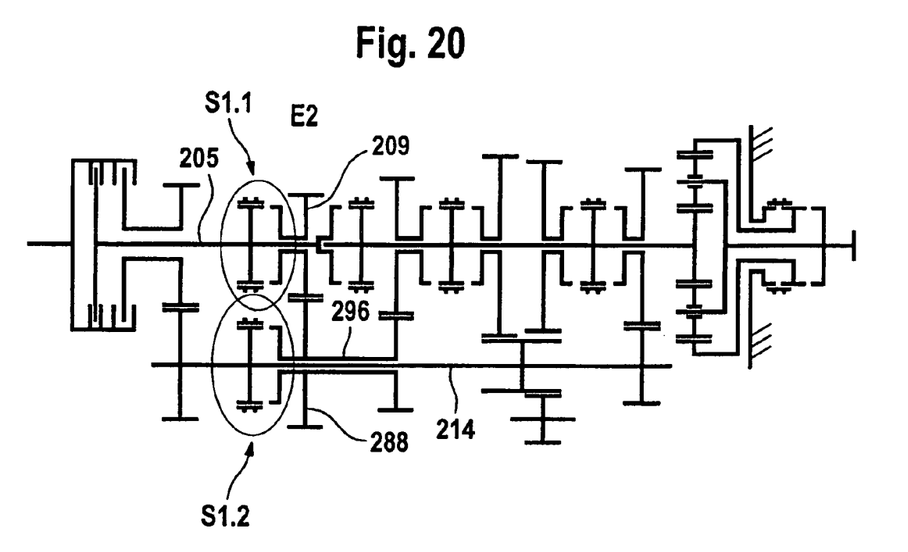
FIG. 20 shows, in a third embodiment, a load-shiftable group transmission which has, in the region of the shift elements for the input constants and the hollow shaft, differs from the preceding two exemplary embodiments.

FIG. 20 shows an embodiment which is further developed in relation to that of FIG. 1. An advantage of said embodiment is that the two shift elements S1.1 and S1.2 are of "conventional" design and are therefore of axially shorter construction than the shift element S1 in the embodiment as per FIG. 1. Here, "conventionally" designed shift elements are to be understood to mean shift elements which have a neutral position and one or two shift positions, with precisely two components—for example gearwheels or shafts—being rotationally fixedly connected to one another in said shift position(s). In contrast, in the central position of the shift element S1 as per FIG. 1, there is no neutral position, but rather three components are rotationally fixedly connected relative to one another.

In FIG. 20, instead of the shift element S1 of FIG. 1, a shift element S1.1 and a shift element S1.2 are provided. An input gearwheel 209 of the second input constant E2 is a loose wheel, whereas the output gearwheel 288 of the second input constant E2 is rotationally fixedly arranged coaxially on the hollow shaft 296. The shift elements S1.1 can be moved from the forward neutral position only into a rear position in which it rotationally fixedly connects the input gearwheel 209 to the inner shaft 205. The shift element S1.2 can be moved from the forward neutral position only into a rear position in which it rotationally fixedly connects the output gearwheel 288 or the hollow shaft 296 to the countershaft 214.

The load-shiftable group transmission as per FIG. 20 can alternatively also be designed with two countershafts, similarly to FIG. 17.

In the load-shiftable group transmissions as per FIG. 1, FIG. 17 and FIG. 20, it is not possible to carry out double downshifts or double upshifts without an interruption in tractive force. Within the large gear group and the small gear group, however, it is possible to realize two in each case triple downshifts or triple upshifts. By way of example, for the 16-gear variant, these are the following jumps:

in the large gear group, the jump from the fifteenth forward gear V15 into the twelfth forward gear V12 and back,
in the large gear group, the jump from the thirteenth forward gear V13 into the tenth forward gear V10 and back,
in the small gear group, the jump from the seventh forward gear V7 into the fourth forward gear V4 and back, and
in the small gear group, the jump from the fifth forward gear V5 into the second forward gear V2 and back.

Here, the triple shifts V13⇌V10 and V5⇌V2 without an interruption in tractive force can be carried out in each case between two forward gears which do not belong to the same gear group of sequentially load-shiftable gears.

In the load-shiftable group transmissions as per FIG. 1 and FIG. 17 and FIG. 20, it is accordingly possible to provide up to sixteen forward gears and, in principle, four reverse gears. Alternatively, it is possible to provide twelve forward gears and two creep gears, so that two adjacent gear groups are generated by in each case six sequentially load-shiftable forward gears. The load-shiftable group transmission can also be designed as a single fast gear transmission.

It is also possible to shift between two adjacent forward gears with different transmission ratio in the main group 100 without an interruption in tractive force by virtue of the double wheel 101 as a loose wheel being arranged on the countershaft 14. The uppermost six forward gears in the large and small gear groups are therefore sequentially load-shiftable.

In the exemplary embodiments as per FIG. 1 and FIG. 17, it is possible for the two input constants to be designed as fixed wheels on the respective driveshafts. Here, the countershaft can be decoupled in the direct gear. If a second countershaft is provided, an additional shift element is required for the latter. The shift sleeve on the countershaft is designed without a neutral position. A wide design of the shift element overall can therefore be necessary, since the shift sleeve of the shift element "overhangs" beyond the shift element in the outer positions. As a result of the use of a hollow shaft, the countershaft must be of relatively thin design, so that the embodiment with two countershafts is particularly advantageous. The drive toothing with the greatest transmission ratio of a forward gear and of the reverse gear is arranged axially centrally on the countershaft.

Figure 21:
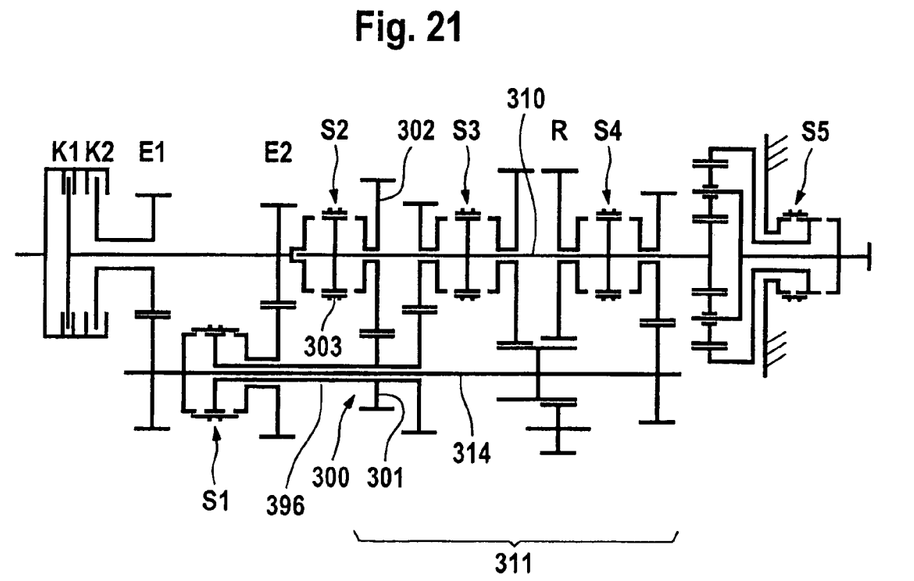
FIG. 21 shows, in a fourth embodiment, a load-shiftable group transmission which can be in the form of a 20-gear transmission or a 16-gear transmission with two creep gears or a 12-gear transmission with four creep gears.
Figure 22:
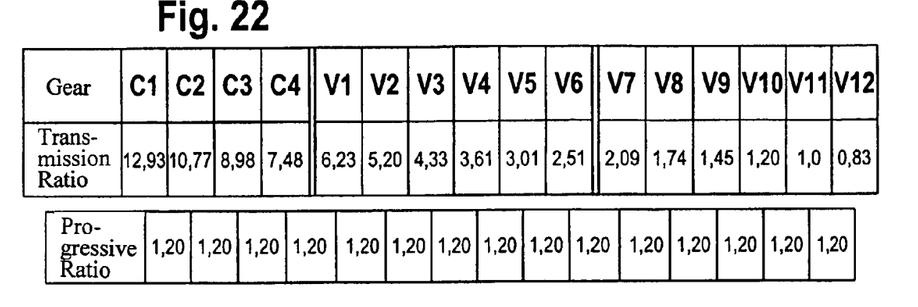
FIG. 22 shows a first possible transmission ratio configuration for the fourth embodiment as a 12-gear transmission with four creep gears.

FIG. 21 shows, in a fourth embodiment, a load-shiftable group transmission which can be embodied as a 20-gear transmission or as a 16-gear transmission with two creep gears or as a 12-gear transmission with four creep gears. In addition to the load-shiftable group transmission as per FIG. 1, the main group 311 has a further gearwheel pair 300. This then gives up to twenty forward gears. Alternatively, it is also possible for up to sixteen forward gears and two creep gears to be provided. It is also possible for twelve forward gears and four creep gears to be provided. Here, the hollow shaft 396 which is arranged coaxially on the countershaft 314 supports a third gearwheel which is designed as a fixed wheel 301. The fixed wheel 301 meshes with a loose wheel 302, which forms the furthest forward gearwheel of the main group 311. In contrast to the exemplary embodiment as per FIG. 1, the second shift element S2 acts at both sides, so that, in the event of a movement of a shift sleeve 303 rearward, a rotationally fixed connection is produced between the main shaft 310 and the loose wheel 302. The transmission construction otherwise corresponds fundamentally to the transmission construction as per FIG. 1. Similarly to the load-shiftable group transmission with the shift diagram as per FIG. 19, the load-shiftable group transmission as per FIG. 21 in the embodiment with twelve forward gears and four creep gears also has two adjacent gear groups of in each case six sequentially load-shiftable forward gears.

The load-shiftable group transmission as per FIG. 21 can also, similarly to FIG. 17, be designed with two countershafts.

With regard to the first exemplary embodiment, it has already been discussed that the step from the highest creep gear to the lowest forward gear of the small gear group and
from the highest forward gear of the small gear group to the lowest forward gear of the large gear group can differ from strictly geometric stepping. In the embodiment as per FIG. 21, too, it is similarly possible for the progressive ratio from the second creep gear C2 to the third creep gear C3 to be selected to differ from the other gear steps. Here, an embodiment is advantageous in particular in which the progressive ratio from the second creep gear C2 to the third creep gear C3 is greater than the other gear steps. Here, FIG. 22 to FIG. 25 show, for the load-shiftable group transmission as per FIG. 21, exemplary transmission ratio configurations for the variant as a 12-gear transmission with four creep gears. In all four transmission ratio configurations FIG. 22 to FIG. 25, the plurality of forward gears is geometrically stepped with a progressive ratio of 1.20.

Figure 23:
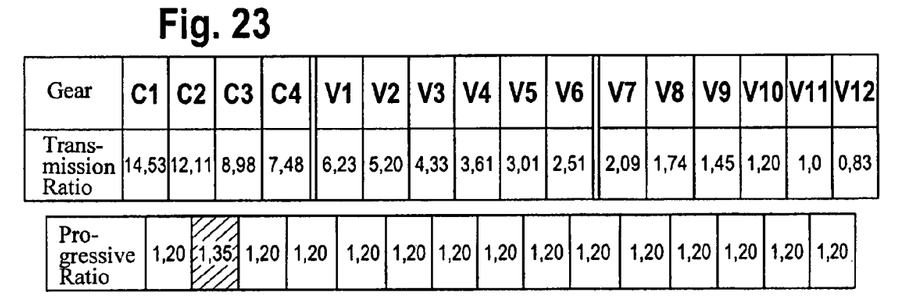
FIG. 23 shows a second possible transmission ratio configuration for the fourth embodiment as a 12-gear transmission with four creep gears.

In FIG. 23, the progressive ratio from the second creep gear C2 to the third creep gear C3 is 1.35, so that said progressive ratio is significantly greater than the plurality of progressive ratios.

Figure 24:
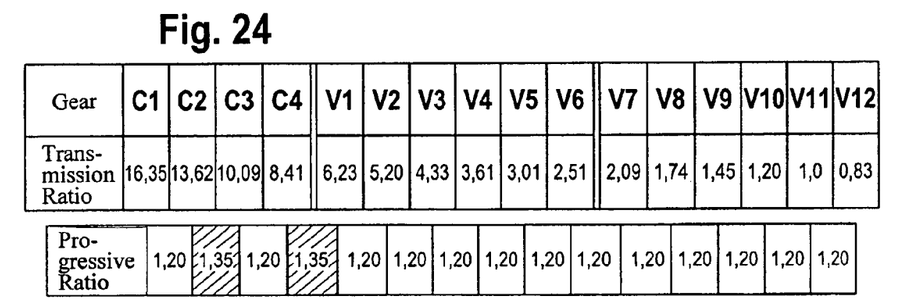
FIG. 24 shows a third possible transmission ratio configuration for the fourth embodiment as a 12-gear transmission with four creep gears.

In FIG. 24, the progressive ratio from the fourth creep gear C4 to the first forward gear V1 is also 1.35, so that said progressive ratio is also significantly greater than the plurality of progressive ratios.

Figure 25:
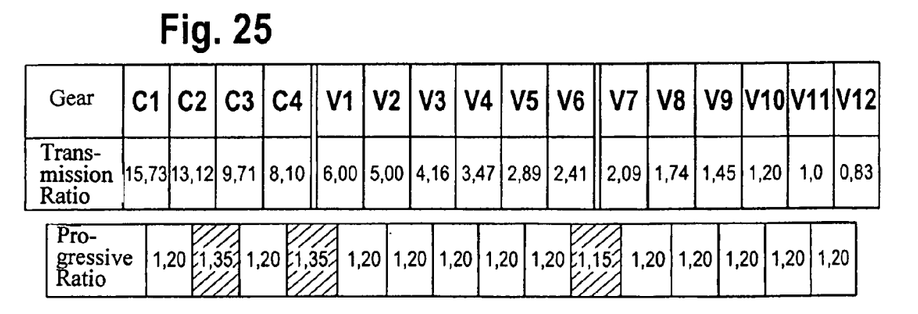
FIG. 25 shows a fourth possible transmission ratio configuration for the fourth embodiment as a 12-gear transmission with four creep gears.

FIG. 25 represents a further development of the transmission ratio configuration as per FIG. 24, with the progressive ratio from the sixth forward gear V6 to the seventh forward gear V7 being 1.15, so that said progressive ratio is significantly lower than the plurality of progressive ratios.

The other variants—also of the first exemplary embodiment as per FIG. 1—can be similarly stepped with regard to the transmission ratio.

With regard to the multiple downshift, the principles illustrated as per FIG. 1 also apply to the load-shiftable group transmission as per FIG. 21.

Figure 26:
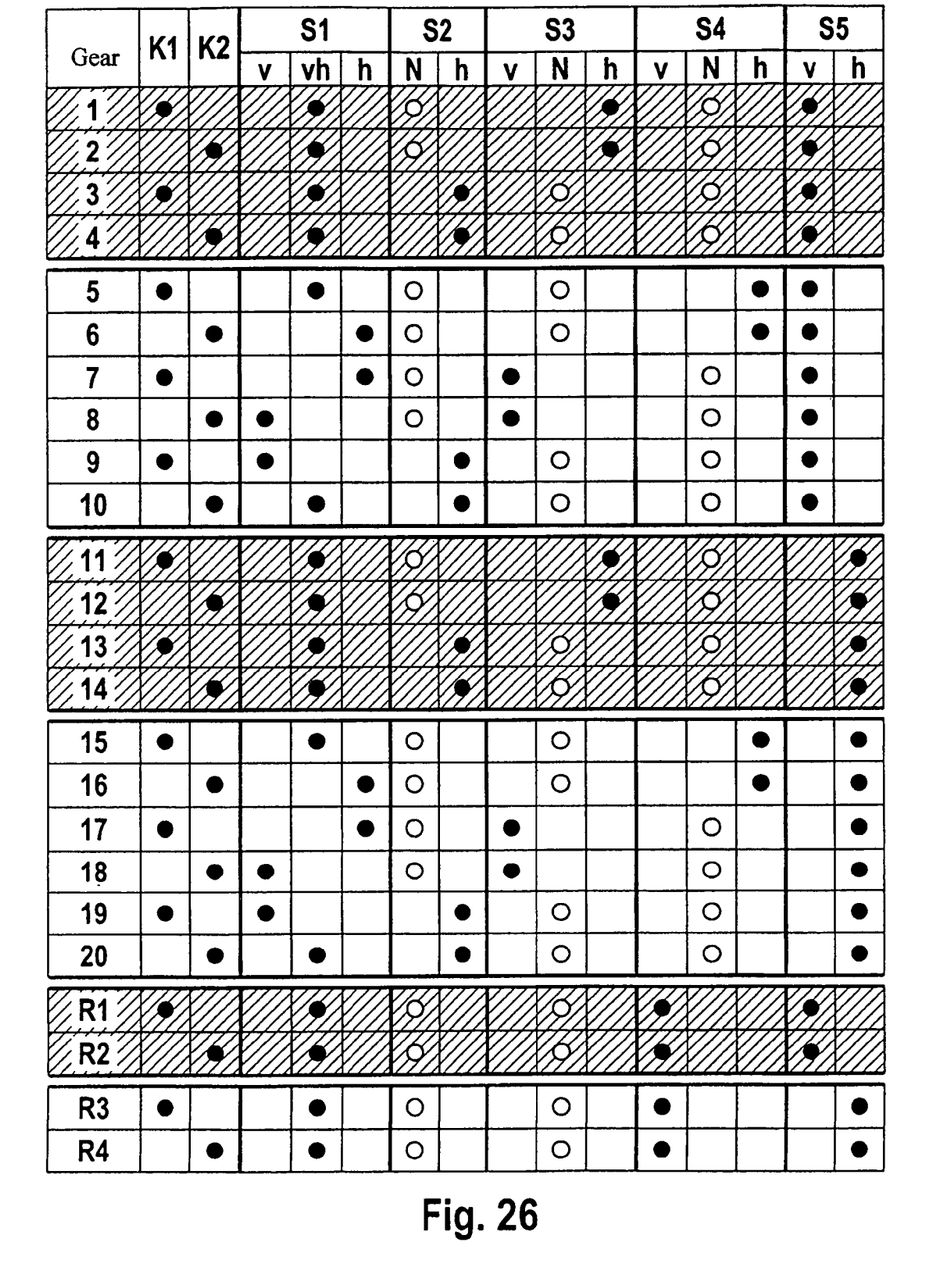
FIG. 26 shows a shift diagram of the load-shiftable group transmission as per FIG. 21 in the form of a 20-gear transmission.
Figure 27:
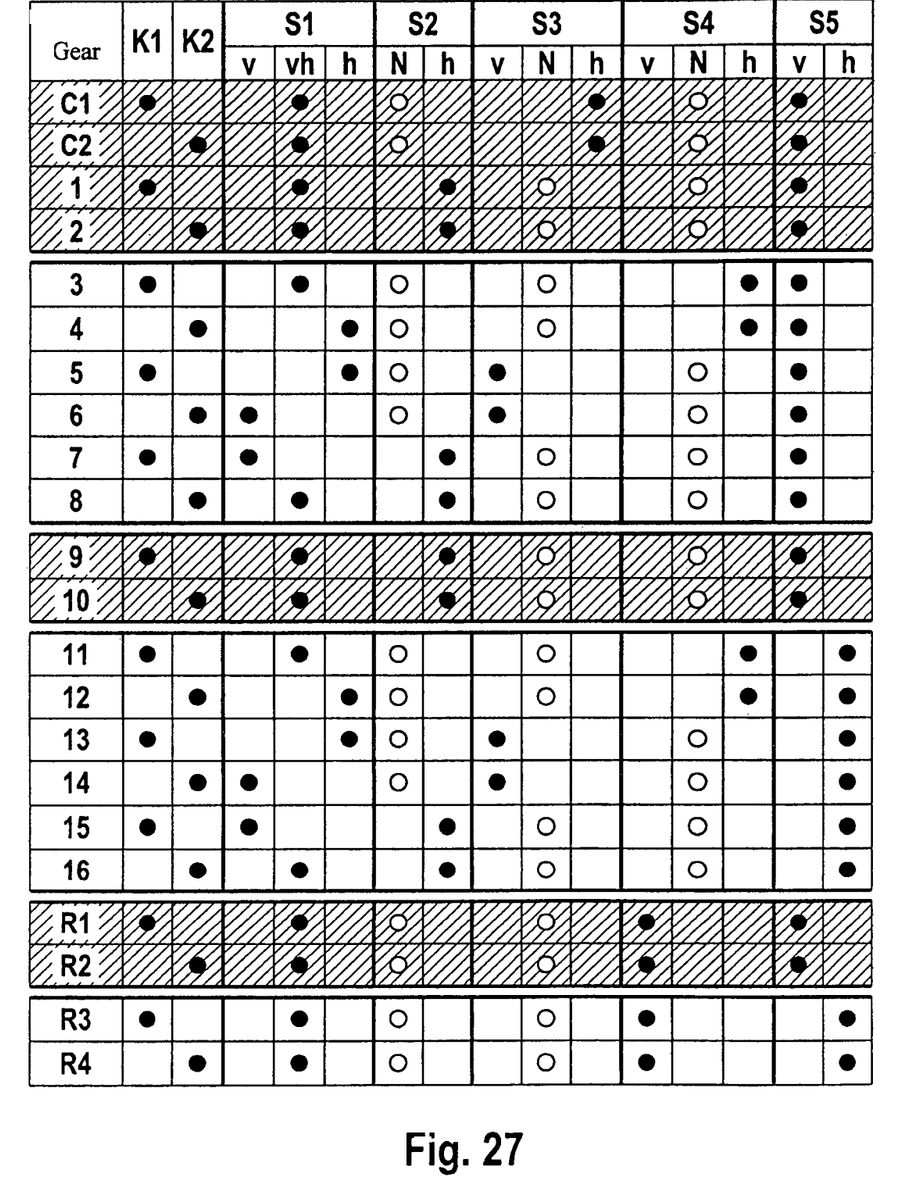
FIG. 27 shows a shift diagram of the load-shiftable group transmission as per FIG. 21 in the form of a 16-gear transmission with two creep gears.
Figure 28:
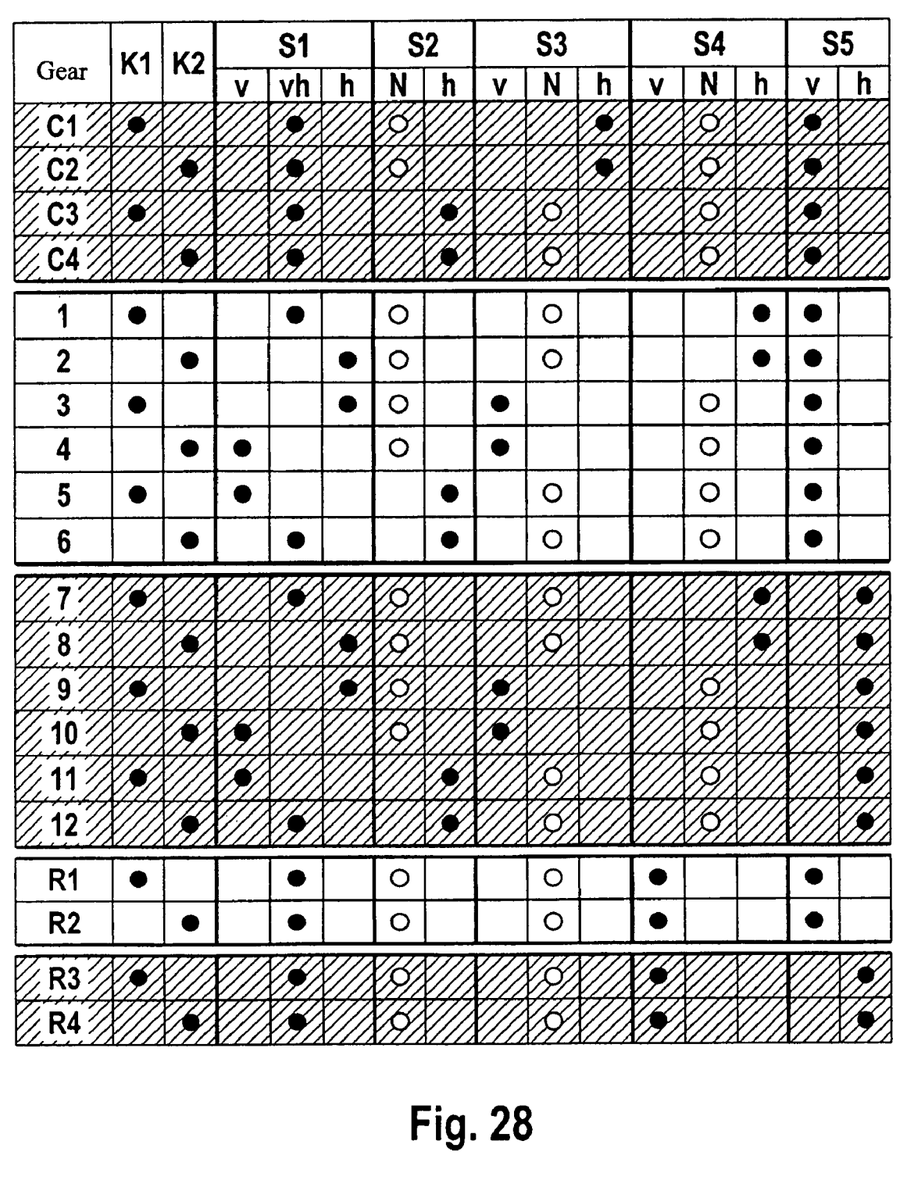
FIG. 28 shows a shift diagram of the load-shiftable group transmission as per FIG. 21 in the embodiment as a 12-gear transmission with four creep gears.

Here, FIG. 26 shows a shift diagram of the load-shiftable group transmission as per FIG. 21 in the embodiment as a 20-gear transmission. FIG. 27 shows a shift diagram of the load-shiftable group transmission as per FIG. 21 in the embodiment as a 16-gear transmission with two creep gears. FIG. 28 shows a shift diagram of the load-shiftable group transmission as per FIG. 21 in the embodiment as a 12-gear transmission with four creep gears.

In the load-shiftable group transmission as per FIG. 21, it is accordingly possible for up to twenty forward gears and in principle four reverse gears to be provided. The load-shiftable group transmission can also be embodied as a single fast gear transmission. As a result of the particular embodiment of the hollow shaft 36 on the countershaft 314, it is possible to shift without an interruption in tractive force between two adjacent gears with different transmission ratio in the main group 311.

In the exemplary embodiment as per FIG. 21, it is possible for the two input constants to be embodied as fixed wheels on the respective intermediate shafts. Here, the countershaft can be decoupled in the direct gear. If a second countershaft is provided, an additional shift element is required for the latter. The shift sleeve on the countershaft is designed without a neutral position. A wide design of the shift element overall can therefore be necessary, since the shift sleeve of the shift element "overhangs" beyond the shift element in the outer positions. As a result of the use of a hollow shaft, the countershaft must be of relatively thin design, so that the embodiment with two countershafts is particularly advantageous. The advantage of the variant with twelve forward gears and four creep gears is that a similar scope of dual-clutch transmission functionality is provided as in the embodiment variant as per the shift diagram of FIG. 19. Aside from the four creep gears, one obtains an interruption in tractive force only during the switch in the range group. If one selects the following progressive ratios:

between the creep gears C1 and C2: 1.20
between the creep gears C2 and C3: 1.35
between the creep gears C3 and C4: 1.20
between the fourth creep gear C4 and the first forward gear V1: 1.35
the rest of the gears: 1.20 then one obtains an overall spread of 19.5. However, with said progressive ratio selection, it can be necessary, depending on the intended use of the vehicle, when the vehicle is fully loaded to utilize the creep gears—at least the third creep gear C3 or the fourth creep gear C4—also during starting, since the transmission ratio of the "actual" first forward gear for utility vehicle applications is relatively long. With regard to the installation length, the design of two gear pairs as creep gears would be favorable, since these are of axially shorter construction than "normal forward gears". Creep gears of said type are of axially shorter construction because they are utilized only in one of two shift states of the range group, for which reason the proportion of time for which they are utilized is lower than that of a normal forward gear which is utilized in both shift states of the range group.

In all the exemplary embodiments, the fifth shift element S5 which is assigned to the range group can also be designed, instead of as a claw clutch, as a frictionally engaging clutch, so that the range group can be power-shifted. A multiplate clutch or a reinforced single-cone or multi-cone synchronizing device in particular lend themselves for use as a frictionally engaging clutch.

Instead of only two input constants E1 and E2, the split unit can also, in an alternative embodiment, have more—in particular three—input constants.

The described embodiments are merely exemplary embodiments. A combination of the described features for different embodiments is likewise possible. Further features, in particular features which are not described, of the device parts belonging to the invention can be gathered from the geometries of the device parts illustrated in the drawings. A claim of the size ratios of the gearwheel pairs in the main group of the load-shiftable group transmission is reserved in particular. In particular, the numerical values, specified in FIG. 22 to FIG. 25, for the transmission ratio and for the progressive ratio with regard to the respective forward and reverse gears are features whose claim is reserved.

What is claimed is:

1. A load-shiftable group transmission having at least first and second input constants (E1, E2) and a dual clutch (1) which comprises first and second individual clutches (K1, K2) providing a first power path from the first individual clutch (K1) via a direct forward gear stage (V15 of a shifting program) to a main shaft (10), with fore and after forward gear stages (V14 and V16) disposed in the shifting program directly adjacent to the direct gear stage (V15) with a power path extending via the second individual clutch (K2) and a countershaft (14), a hollow shaft (96) arranged concentrically with respect to the countershaft (14) and supporting at least first and second countershaft gearwheels (88, 13) of which the first countershaft gearwheel (88) belongs to the second input constant (E2), and a first clutch gearwheel (8) arranged closest to the dual clutch (1) belongs to the first input constant (E1), the power path of the after gear stage (V16) extending from the second individual clutch (K2) via the first input constant (E1), the second input constant (E2) and the main shaft (10) which is rotationally fixedly coupled to a second gearwheel (9) of the second input constant (E2), the hollow shaft (96) including a first shift element (S1) for rotationally coupling and decoupling the second input constant (E2) from the hollow shaft (96).

2. The load-shiftable group transmission as claimed in claim 1, wherein the first clutch gearwheel (8), which is situated closest to the dual clutch (1) and belongs to the first input constant (E1), is a fixed wheel (8) connected to the second clutch K2.

3. The load-shiftable group transmission as claimed in claim 1, wherein, with all the gearwheel pairs of one main group (100), using the two different input constants (E1, E2), at least two different transmission ratios can be established, with no transmission ratio being formed twice.

4. The load-shiftable group transmission as claimed in claim 1, wherein shifting between two adjacent gear stages is possible without an interruption in tractive force between two adjacent gears established by a change between the input constants (E1 and E2).

5. The load-shiftable group transmission as claimed in claim 1, wherein shifting between at least two adjacent forward gears occurs by means of a change of the transmission ratio within the main group (10) without an interruption in tractive force.

6. The load-shiftable group transmission as claimed in claim 1, wherein the power path which extends via the two input constants (E1-E2) provides a step-up transmission ratio.

7. The load-shiftable group transmission as claimed in claim 1, wherein the highest six forward gears (V11-V16 or V7-V12 or V15-V20) are sequentially load-shiftable.

8. The load-shiftable group transmission as claimed in claim 1, wherein the first shift element (S1) is designed to provide different shift connections in each of three possible positions (v, vh, h) wherein it rotationally fixedly couples at least two transmission elements to one another, with the countershaft (14) being coupled to the hollow shaft (96) and to a loose wheel (88), which is coaxially rotatably arranged on the hollow shaft (96), in one of the three positions.

9. The load-shiftable group transmission as claimed in claim 1, wherein a range group (28) is provided, by means of which the number of gears can be increased.

10. The load-shiftable group transmission as claimed in claim 9, wherein the range group (28) is one of a planetary gear set and a reduction gearing.

11. The load-shiftable group transmission as claimed in patent claim 9, wherein the range group (28) can be shifted by means of a clutch.

12. The load-shiftable group transmission as claimed in claim 1, wherein the transmission includes at least two countershafts (114a, 114b).

13. The load-shiftable group transmission as claimed in claim 8, wherein at least one creep gear (C1 to C2) is provided, whose transmission stage in the main transmission (100) is utilized only in one shift state (v) of the range group (28).

14. The load-shiftable group transmission as claimed in claim 1, wherein the shifting means (1) allow sequential shifting without an interruption in tractive force in both directions between at least six successive forward gears (V11 to V16).

15. The load-shiftable group transmission as claimed in claim 1, wherein at least one transmission stage of at least one of forward and reverse gears in the main transmission (100 or 311) is engaged by a form-fitting claw clutch without a synchronizing element.

16. The load-shiftable group transmission as claimed in claim 1, wherein with the direct gear (V15) engaged, at least one countershaft (14) can be rotationally decoupled from the rotational movement of a drive motor, which is connected to the dual clutch (1), and from the main shaft (10).

17. The load-shiftable group transmission as claimed in claim 1, wherein the forward gear transmission ratios of the transmission stages are stepped in one of a geometric ratio, a progressive ratio, an increasing progressive ratio and a decreasing progressive ratio.

18. The load-shiftable group transmission as claimed in claim 17, wherein at least two progressive ratios (C2 to C3, V6 to V7) significantly different from the rest of the progressive ratios are provided, and at least one of said progressive ratios (V6 to V7) is lower than the plurality of progressive ratios and at least one further progressive ratio (C2 to C3) is greater than the plurality of progressive ratios.

19. The load-shiftable group transmission as claimed in claim 1, wherein an input gearwheel (209) of the second input constant (E2) is a loose gearwheel, whereas an output gearwheel (288) of the second input constant (E2) and a further gearwheel (13) are rotationally fixedly arranged coaxially on the hollow shaft (296).

* * * * *